US012777066B1

(12) United States Patent
Marino et al.

(10) Patent No.: US 12,777,066 B1
(45) Date of Patent: Oct. 27, 2026

(54) SYSTEMS AND METHODS FOR UTILIZING A SECURITY ASSISTANT FOR PERFORMING SECURITY TASKS BASED ON RECEIVED MIXED MEDIA INPUTS

(71) Applicant: GEN DIGITAL INC., Tempe, AZ (US)

(72) Inventors: Daniel Marino, Los Angeles, CA (US); Michael Shavell, Merrimack, NH (US); Viliam Lisý, Prague (CZ); Andrew Gardner, Roswell, GA (US); Michal Pěchouček, Prague (CZ); Sadia Afroz, Berkeley, CA (US); Petr Somol, Prague (CZ)

(73) Assignee: Gen Digital Inc., Tempe, AZ (US)

( * ) Notice: Subject to any disclaimer, the term of this patent is extended or adjusted under 35 U.S.C. 154(b) by 199 days.

(21) Appl. No.: 18/591,559

(22) Filed: Feb. 29, 2024

Related U.S. Application Data

(60) Provisional application No. 63/503,042, filed on May 18, 2023.

(51) Int. Cl.
*H04L 9/40* (2022.01)

(52) U.S. Cl.
CPC ...... *H04L 63/1441* (2013.01); *H04L 63/1416* (2013.01)

(58) Field of Classification Search
CPC ........................ H04L 63/1441; H04L 63/1416
See application file for complete search history.

(56) References Cited

U.S. PATENT DOCUMENTS

| | | | | |
|---|---|---|---|---|
| 2006/0107301 | A1* | 5/2006 | Leibbrandt | A61B 5/1117 348/E7.054 |
| 2011/0282906 | A1* | 11/2011 | Wong | G06F 16/7837 707/E17.03 |
| 2017/0017648 | A1* | 1/2017 | Pearlman | G06F 16/583 |
| 2017/0154273 | A1* | 6/2017 | Guttmann | G06V 10/94 |
| 2020/0073903 | A1* | 3/2020 | Jain | G06F 40/117 |
| 2022/0382840 | A1* | 12/2022 | Weston | G06V 40/30 |
| 2023/0115167 | A1* | 4/2023 | Biffi | G06N 20/20 382/155 |
| 2023/0206010 | A1* | 6/2023 | Luan | G06F 40/258 704/9 |
| 2023/0376520 | A1* | 11/2023 | Pinder | G06F 16/432 |
| 2024/0330444 | A1* | 10/2024 | Soryal | G06F 21/554 |

* cited by examiner

*Primary Examiner* — Daniel B Potratz
*Assistant Examiner* — Matthias Habtegeorgis
(74) *Attorney, Agent, or Firm* — ALG Intellectual Property, LLC

(57) ABSTRACT

A computer-implemented method for utilizing a security assistant for performing security tasks based on received mixed media inputs may include (i) identifying a context associated with mixed media content, (ii) determining a security task associated with the mixed media content, (iii) clarifying an ambiguity based on the context associated with the mixed media content, and (iv) performing a security action that protects against potential security threats in the mixed media content by extracting identifiers from the mixed media content for detection.

20 Claims, 7 Drawing Sheets

SYSTEMS AND METHODS FOR UTILIZING A SECURITY ASSISTANT FOR PERFORMING SECURITY TASKS BASED ON RECEIVED MIXED MEDIA INPUTS

CROSS REFERENCE TO RELATED APPLICATION

This application claims the benefit under 35 U.S.C. § 119(e) of U.S. Provisional Patent Application Ser. No. 63/503,042, filed May 18, 2023, the disclosure of which is hereby incorporated herein, in its entirety, by this reference.

BACKGROUND

Traditional security software platforms utilized to respond to user assistance requests are limited to text-based queries. However, in some cases, users may wish to submit assistance requests in mixed media formats, such as screenshots, images, video, and audio in combination with text queries (e.g., for scam detection), which is a shortcoming of traditional software security platforms. In particular, traditional security software platforms are unable to identify security relevant tasks from user-provided mixed media inputs and context.

SUMMARY

As will be described in greater detail below, the present disclosure describes various systems and methods for utilizing a security assistant for performing security tasks based on received mixed media inputs.

In one example, a method for utilizing a security assistant for performing security tasks based on received mixed media inputs may include (i) identifying, by one or more computing devices, a context associated with mixed media content, (ii) determining, by the one or more computing devices, a security task associated with the mixed media content, (iii) clarifying, by the one or more computing devices, an ambiguity based on the context associated with the mixed media content, and (iv) performing, by the one or more computing devices, a security action that protects against potential security threats in the mixed media content by extracting identifiers from the mixed media content for detection.

In some examples, the mixed media content context may be identified by (i) receiving a screenshot of the mixed media content, (ii) analyzing the screenshot to identify information associated with the mixed media content, and (iii) identifying the context based on the information. In one embodiment, the screenshot may be received by monitoring a device display by a security application executing on the one or more computing devices and then capturing the screenshot from the device display. In one example, information associated with the mixed media content may include metadata (e.g., a timestamp, an image location tag, and/or location data), message data, website data and/or application data.

In some examples, the security task associated with the mixed media content may be determined by training a machine-learning algorithm (e.g., a deep learning network algorithm) to categorize image data describing the mixed media content into one or more classes and then determining the security task based on the classes. Additionally or alternatively, the security task associated with the mixed media content may be determined by training a machine-learning algorithm to perform image-captioning on an image representing the mixed media content and then retrieving a description of the image representing the mixed media content based on the image-captioning.

In some examples, the ambiguity based on the context associated with the mixed media content may be clarified by presenting a list of potential analysis tasks for selection by a user as the security task or presenting a list of disambiguating questions to the user for identifying the security task.

In some examples, the security action task that protects against the potential scam content in the mixed media content may be performed by (i) identifying one or more entities associated with the potential security threats from the mixed media content, (ii) extracting the entities as the identifiers, and (iii) submitting the identifiers to a threat detection model.

In one embodiment, a system for utilizing a security assistant for performing security tasks based on received mixed media inputs may include at least one physical processor and physical memory comprising computer-executable instructions and one or more modules that, when executed by the physical processor, cause the physical processor to (i) identify, by an identification module, a context associated with mixed media content, (ii) determine, by a determining module, a security task associated with the mixed media content, (iii) clarify, by a disambiguating module, an ambiguity based on the context associated with the mixed media content, and (iv) perform, by a security module, a security action that protects against potential security threats in the mixed media content by extracting identifiers from the mixed media content for detection.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a context associated with mixed media content, (ii) determine a security task associated with the mixed media content, (iii) clarify an ambiguity based on the context associated with the mixed media content, and (iv) perform a security action that protects against potential security threats in the mixed media content by extracting identifiers from the mixed media content for detection.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
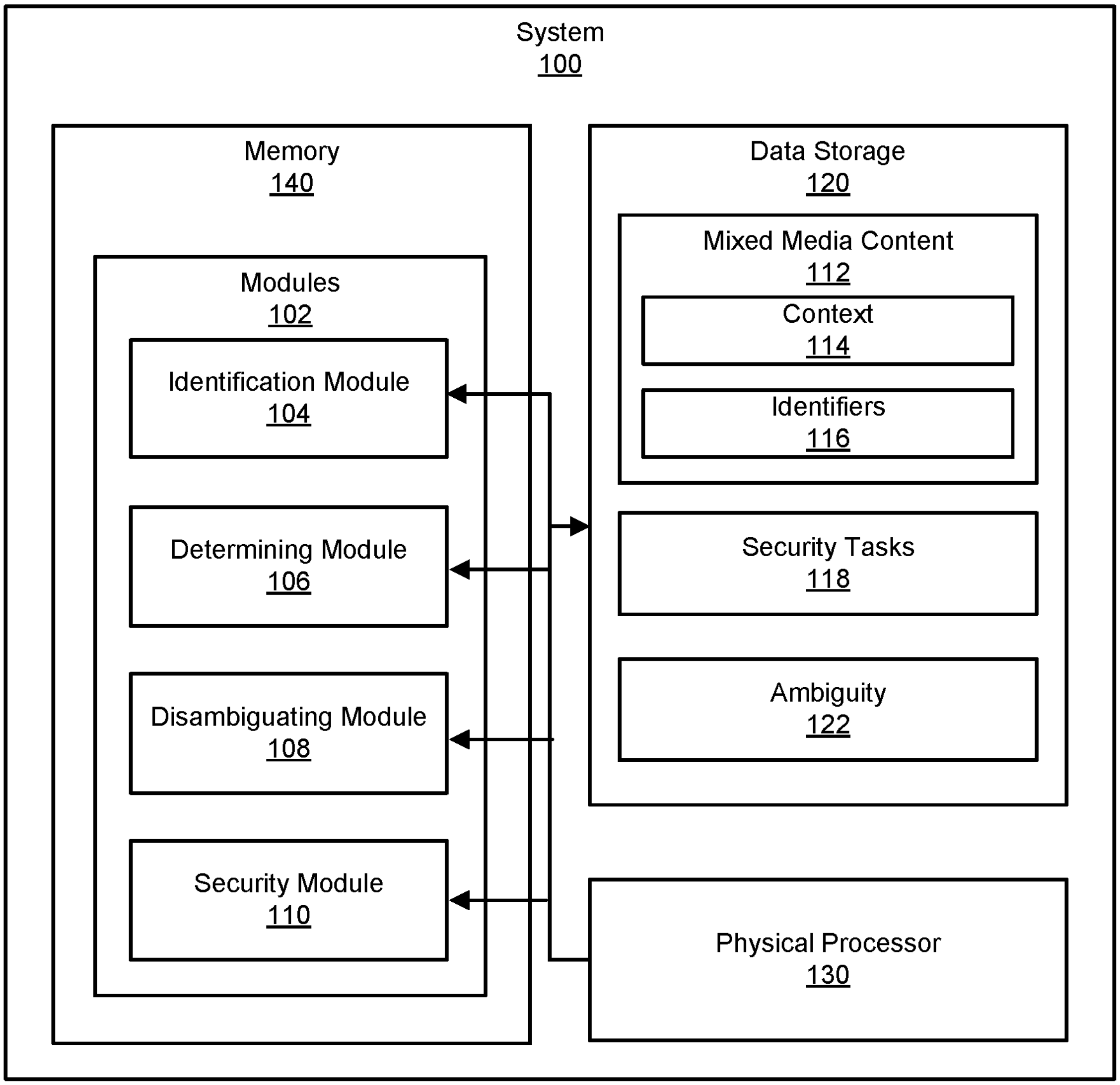
FIG. 1 is a block diagram of an example system for utilizing a security assistant for performing security tasks based on received mixed media inputs.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing a security assistant for performing security tasks based on received mixed media inputs. As will be described in greater detail below, the systems and methods described herein may provide and/or utilize a mixed chatbot and collaborative software security agent (i.e., an SSA) that extends a chatbot's functionality to identify relevant security tasks from mixed media content (i.e., text, images, audio and/or video). The SSA may be configured to identify the security tasks by collecting additional context information from a computing device for the mixed media content (e.g., images) and determine a security task that a user wishes the SSA to perform based on the context information. In instance where a desired security task is ambiguous, the SSA may utilize a user's chat history, pose questions, or present a list of options to assist the user in determining a particular task that needs to be addressed. The SSA may then perform task-dependent entity extraction for use as an input to a threat detection model for the determined security task. Moreover, the systems and methods described herein may improve the technical fields of computer device security and/or data privacy by protecting against scams, phishing, or other attacks/threats initiated by malicious actors to facilitate the unintentional disclosure of sensitive/private user data for malicious purposes.

Figure 2:
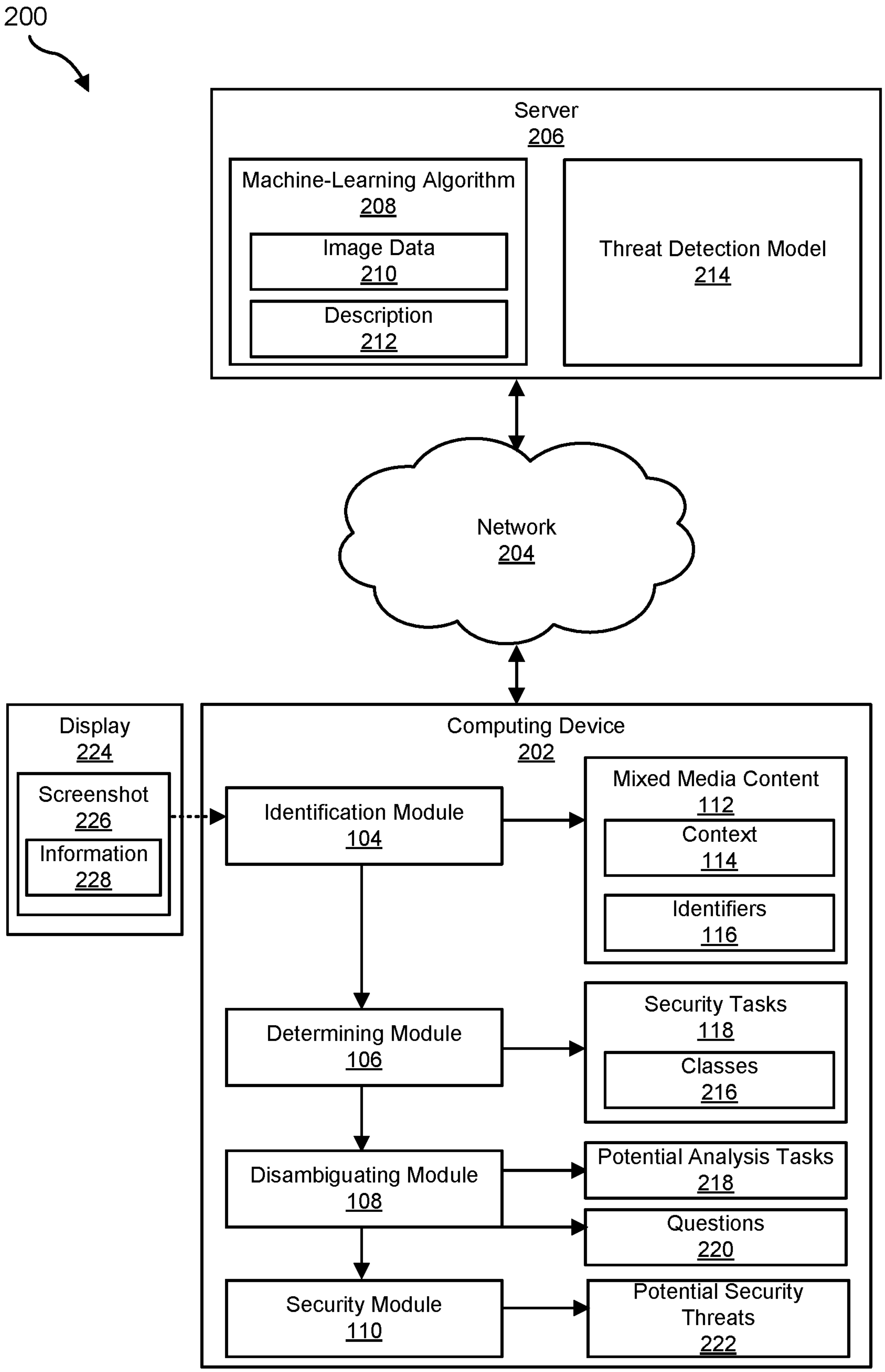
FIG. 2 is a block diagram of an additional example system for utilizing a security assistant for performing security tasks based on received mixed media inputs.

The following will provide, with reference to FIGS. 1-2, detailed descriptions of example systems for utilizing a security assistant for performing security tasks based on received mixed media inputs. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing a security assistant for performing security tasks based on received mixed media inputs. As illustrated in this figure, example system 100 may include one or more modules 102 for performing one or more tasks. For example, and as will be explained in greater detail below, example system 100 may include an identification module 104 that identifies a context 114 associated with mixed media content 112. Example system 100 may additionally include a determining module 106 that determines security tasks 118 associated with mixed media content 112. Example system 100 may also include a disambiguation module 108 that clarifies ambiguity 122 based on context 114 associated with mixed media content 112. Example system 100 may additionally include a security module 110 that performs a security action that protects against potential security threats in mixed media content 112 by extracting identifiers 116 for detection. Although illustrated as separate elements, one or more of modules 102 in FIG. 1 may represent portions of a single module or application.

The term "mixed media content" as used herein, may generally refer to images (including still images and video), text, and/or audio content associated with digital and physical security. Example mixed media content may include, without limitation, screenshots of e-mail messages, e-commerce (or other) websites, security software threat warnings (e.g., malware, identify theft, etc.), map locations/routes, and/or persons of interest/suspicious persons associated with requests for identifying digital and physical security threats such as scam, phishing attacks, malware attacks, identity theft attacks, and/or dangerous physical environments (e.g., unsafe geographic areas, animals, etc.).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing a security assistant for performing security tasks based on received mixed media inputs. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In some examples, data storage 120 may store mixed media content 112 (including context 114 and identifiers 116), security tasks 118, and ambiguity 122.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to utilize a security assistant for performing security tasks based on received mixed media inputs. For example, and as will be described in greater detail below, identification module 104, determining module 106, disambiguating module 108, and security module 110 may cause computing device 202 and/or server 206 to (i) identify context 114 associated with mixed media content 112, (ii) determine a security task 118 (including classes 216) associated with mixed media content 112, (iii) clarify ambiguities identified for a security task 118 (e.g., by presenting a list of potential analysis tasks 218 or questions 220), and (iv) perform, by a security module, a security action that protects against potential security threats 222 in mixed media content 114 by extracting identifiers 116 for detection utilizing threat detection model 214.

Computing device 202 generally represents any type or form of computing device capable of reading computer-executable instructions. In some examples, computing device 202 may be an endpoint device running client-side security software, such as a client smart security assistant application configured to identify potential security threats in mixed media content received as information 228 contained in a screenshot 226 from display 224. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Smart security assistant server 206 generally represents any type or form of computing device that is capable of executing and/or reading computer-executable instructions. In some examples, server 206 may be a backend security server configured to provide a chatbot service for identifying potential security threats for user client devices. In some examples, server 206 may utilize a machine-learning algorithm (e.g. a deep learning network algorithm) which may be trained to categorize image data 210 and/or retrieve a description 212 based on image-captioning). Additional examples of smart security assistant server 206 include, without limitation, application servers, web servers, storage servers, and/or database servers configured to run certain software applications and/or provide various web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and smart security assistant server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
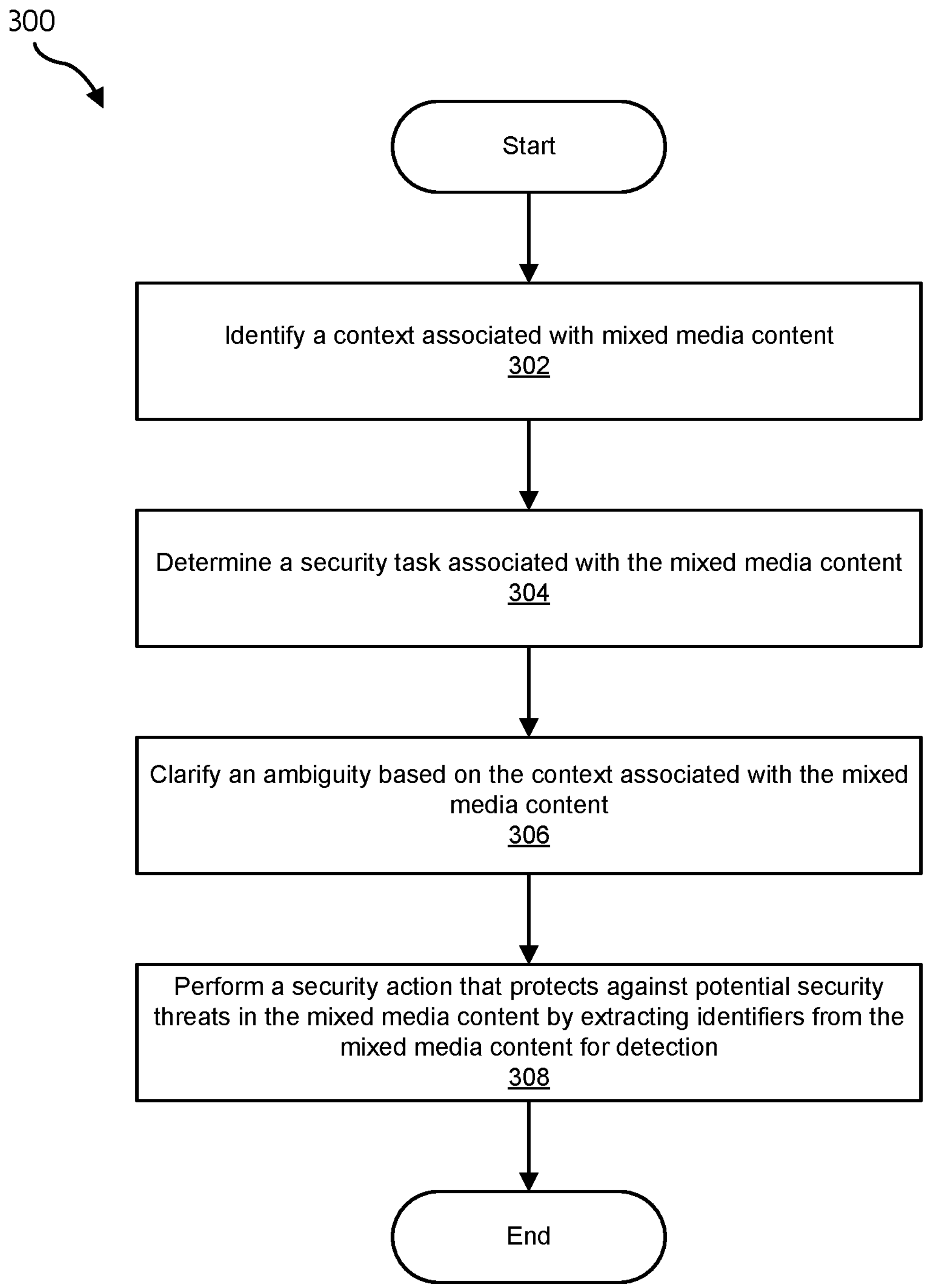
FIG. 3 is a flow diagram of an example method for utilizing a security assistant for performing security tasks based on received mixed media inputs.
Figure 4:
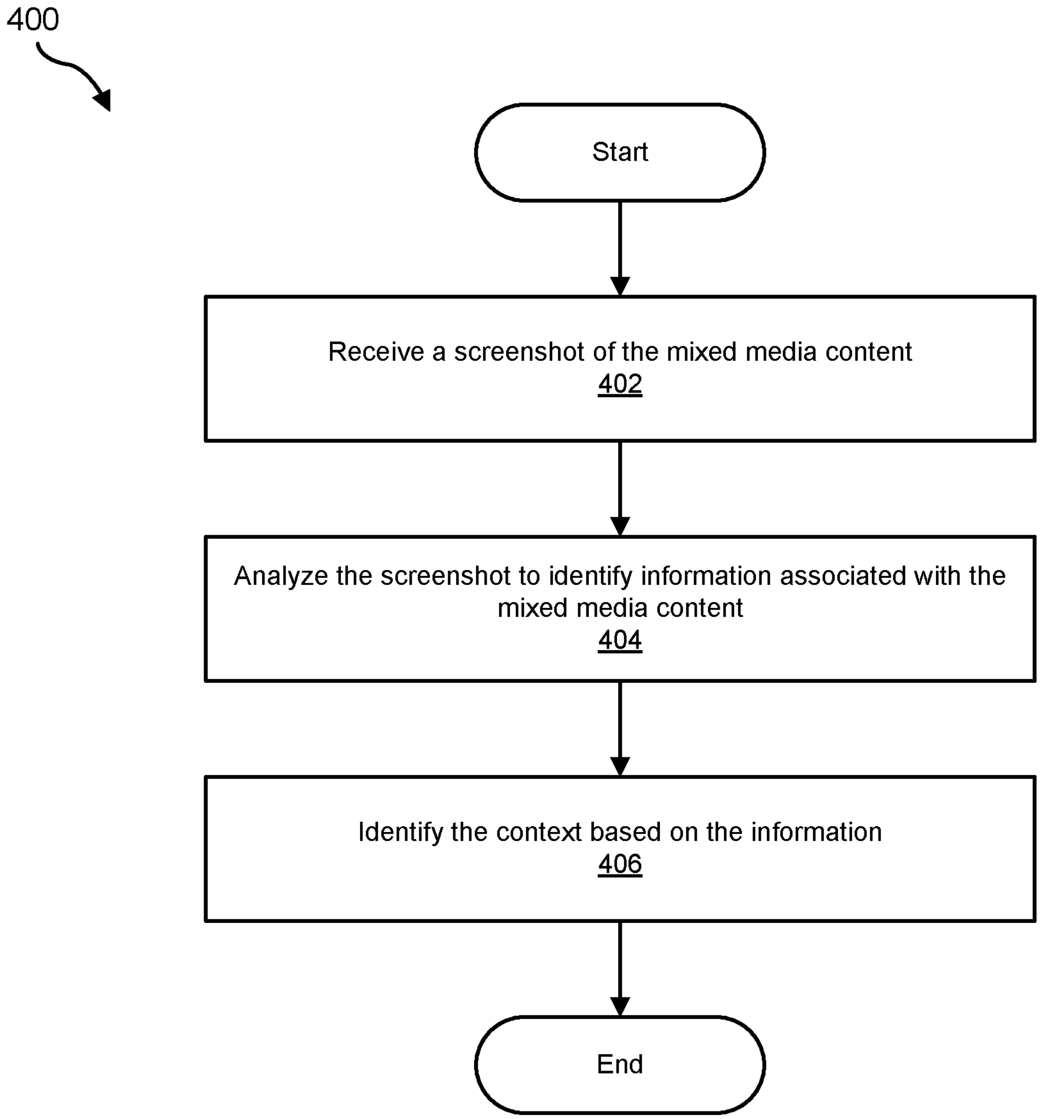
FIG. 4 is a flow diagram of another example method for utilizing a security assistant for performing security tasks based on received mixed media inputs.
Figure 5:
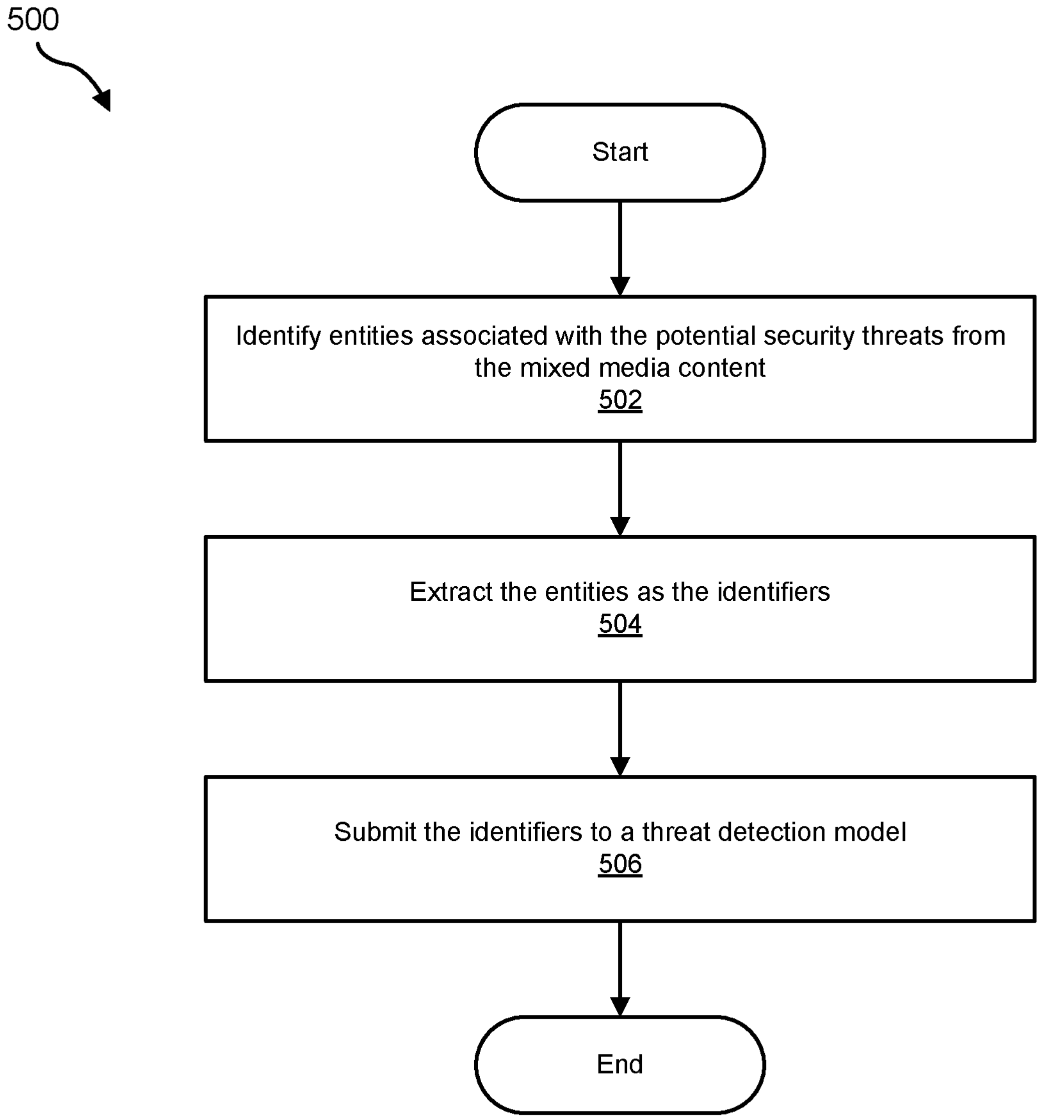
FIG. 5 is a flow diagram of another example method for utilizing a security assistant for performing security tasks based on received mixed media inputs.

FIGS. 3-5 are flow diagrams of example computer-implemented methods 300, 400, and 500 for utilizing a security assistant for performing security tasks based on received mixed media inputs. The steps shown in FIGS. 3-5 may be performed by any suitable computer-executable code and/or computing system, including system 100 in FIG. 1, system 200 in FIG. 2, and/or variations or combinations of one or more of the same. In one example, each of the steps shown in FIGS. 3-5 may represent an algorithm whose structure includes and/or is represented by multiple sub-steps, examples of which will be provided in greater detail below.

As illustrated in FIG. 3, at step 302 one or more of the systems described herein may identify a context associated with mixed media content. For example, identification module 104 may, as part of computing device 202 in FIG. 2, identify context 114 associated with mixed media content 112.

Identification module 104 may identify context 114 in a variety of ways. For example, and turning now to FIG. 4, at step 402, identification module 104 may receive a screenshot 226 of mixed media content 112. In some examples, screenshot 226 may be received by monitoring display 224 for a user submitted image (e.g., an image of a text message for scam detection) and then capturing the image as screenshot 226. In some examples, identification module 104 may be configured to continuously monitor display 224 and check for a submitted screenshot 226 without user intervention.

At step 404, identification module 104 may analyze screenshot 226 to identify information 228 associated with mixed media content 112. In some examples, information 228 may include metadata (e.g., timestamps, image location tags, and/or device GPS locations), message data, device contact list data, website data, and/or application data. For example, identification module 104 may analyze a website screenshot to infer the website's full URL by comparing the website and what can be seen of the domain name in the website screenshot against recent network requests monitored by a security product (e.g., a client smart security assistant application executing on computing device 202). Additionally, information 228 may further include the contents of a notification received upon delivery of message data to a user and the name of the application from which screenshot 226 was taken.

At step 406, identification module 104 may identify context 114 based on information 228. For example, if information 228 describes a news website, then identification module 104 may identify context 114 as relating to a dataset including user privacy concerns and disinformation for security analysis. As another example, if information 228 describes a portion of text from a cropped picture, then identification module 104 may identify context 114 as relating to a dataset including social media posts, text (e.g., SMS) messages, and email for security analysis.

Returning now to FIG. 3, at step 304, one or more of the systems described herein may determine a security task associated with the mixed media content. For example, determining module 106 may, as part of computing device 202 in FIG. 2, determine a security task 118 associated with content 114 identified for mixed media content 112 at step 302.

Determining module 106 may identify security task 118 in a variety of ways. In some examples, determining module 106 may train machine-learning algorithm 208 (which may be a deep learning network algorithm) to categorize image data 210 describing mixed media content 112 into a set of classes 216. For example, classes 216 may include image classes that are commonly requested by users for performing threat analyses such as, without limitation, SMS message screenshots, email messages, warning or error messages, websites, facial features (e.g., a person's face), and map routes. Then, determining module 106 may determine a security task 118 based on a class 216 (e.g., analyzing an SMS message as potentially containing spam).

With respect to the above example, if determining module 106 is unable to clearly determine a security task 118 based on categorizing image data 210 (e.g., a screenshot of a few lines of text could potentially be classified/categorized as a social media post, an SMS message, or an excerpt from an e-mail message), then determining module 106 may train machine-learning algorithm 208 to perform image-captioning on image data 210 including mixed media content 112 and retrieve description 212 of image data 210 based on the image-captioning. In some examples, description 212 may be a description of image data 210 (i.e., the image captured in screenshot 226) in natural language. In some examples, the image caption may become an input to the large language model of a security chatbot, thereby assisting the chatbot in obtaining enough connect about an image to intelligently generate a response and ask any clarifying/disambiguating questions utilizing disambiguity module 108.

At step 306, one or more of the systems described herein may clarify an ambiguity identified based on the context associated with the mixed media content. For example, disambiguity module 108 may, as part of computing device 202 in FIG. 2, clarify an ambiguity 122 based on context 114 associated with mixed media content 112.

Disambiguity module 108 may clarify an ambiguity 122 in a variety of ways. In some examples, disambiguity module 108 may present a list of potential analysis tasks 218 for selection by a user as a security task 118. For example, if screenshot 226 submitted by a user includes an image of a news website, determining module 106 may be unable to determine whether a desired security task 118 would be associated with user privacy (e.g., user concerns over privacy implication associated with website account registration) or disinformation (e.g., user concerns over the accuracy of text in an image of a news article contained in screenshot 226). Additionally or alternatively, disambiguity module 108 may present a list of disambiguating questions 220 to the user for identifying, based on the answers received to questions 220, a security task 118.

At step 308, one or more of the systems described herein may perform a security action that protects against potential security threats in the mixed media content by extracting identifiers from the mixed media content for detection. For example, security module 110 may, as part of computing device 202 in FIG. 2, extract identifiers 116 from mixed media content 112 for detection as potential security threats 222.

Security module 110 may extract identifiers 116 in a variety of ways. For example, and turning now to FIG. 5, at step 502, security module 110 may identify entities associated with potential security threats 222 from mixed media content 112. For example, if screenshot 226 contains an image of an SMS message submitted by a user for a scam determination, security module 110 may be configured to identify URLs, telephone numbers, cryptocurrency wallet addresses, and/or other entities as identifiers 116. As another example, if screenshot 226 contains an image of a route map submitted by a user for a safety analysis, security module 110 may be configured to identify street names in screenshot 226 along with location information (determined from GPS information for computing device 202). As yet another example, if screenshot 226 contains a picture of a person, security module 110 may be configured to perform facial recognition to identify the person for matching with a known identity from the user's contacts, a list of other (e.g., famous persons), and/or criminal records. As yet another example, if mixed media context 112 contains audio data (e.g., a telephone call) submitted by a user for a scam determination, security module 110 may be configured to utilize voice-to-text technology to generate a transcript of the call.

At step 504, security module 110 may extract the entities identified at step 502 as identifiers 116. For example, with respect to an SMS screenshot, security module 110 may be configured to perform optical character recognition (OCR) followed by a text analysis for extracting text artifacts. As another example, with respect to a route map screenshot, security module 110 may be configured to extract a set of coordinates from a mapping database that define a route of interest.

At step 506, security module 110 may submit identifiers 116 to threat detection model 214. For example, security module may submit SMS text along with one or more telephone numbers to a scam detection model.

As explained above in connection with example method 300 in FIG. 3, the systems and methods described herein may provide and/or utilize a mixed chatbot and collaborative software security agent (i.e., an SSA) that extends a chatbot's functionality to identify relevant security tasks from mixed media content (i.e., text, images, audio and/or video). The SSA may be configured to identify the security tasks by collecting additional context information from a computing device for the mixed media content (e.g., images) and determine a security task that a user wishes the SSA to perform based on the context information. In instance where a desired security task is ambiguous, the SSA may utilize a user's chat history, pose questions, or present a list of options to assist the user in determining a particular task that needs to be addressed. The SSA may then perform task-dependent entity extraction for use as an input to a threat detection model for the determined security task.

Figure 6:
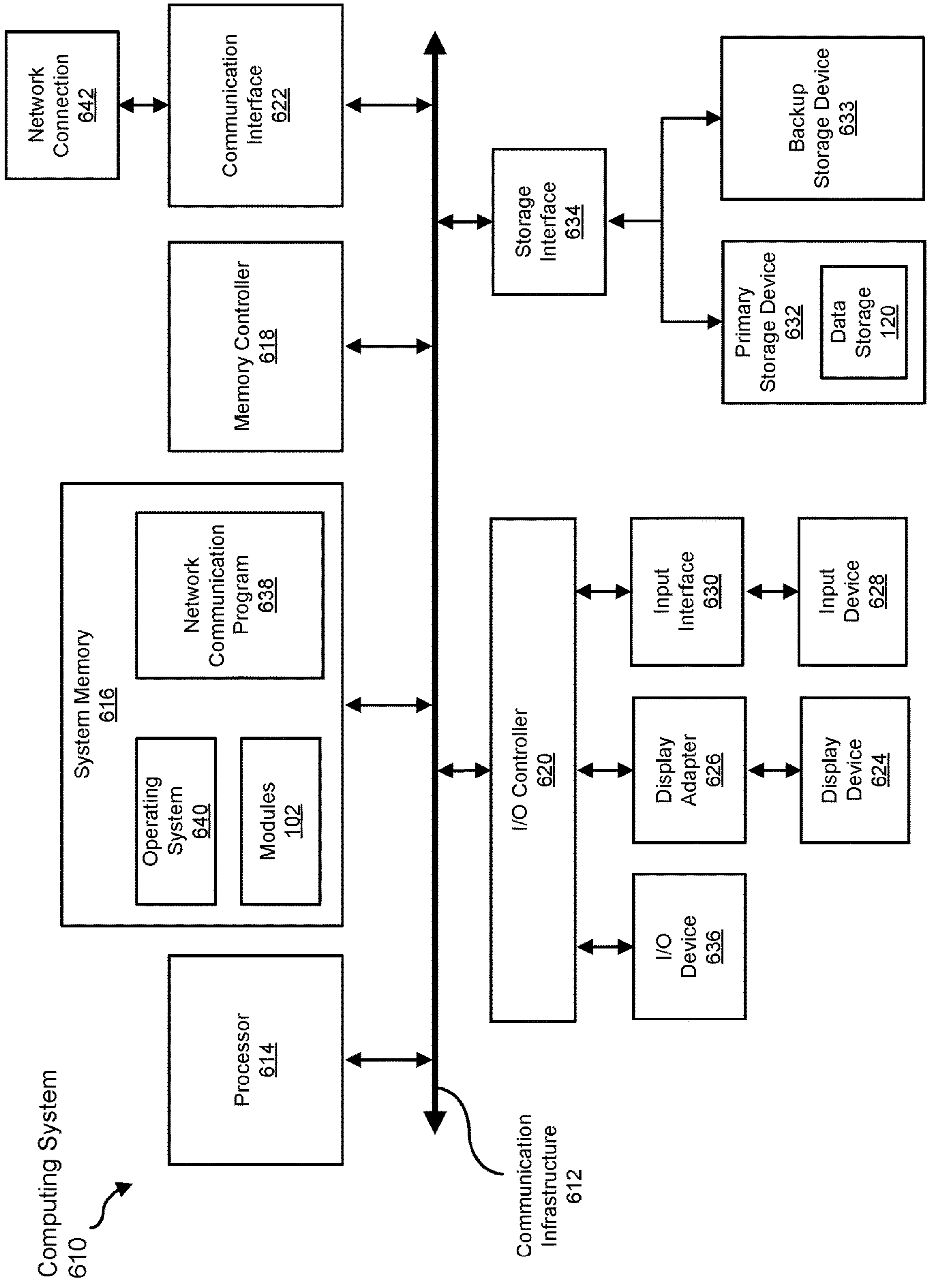
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
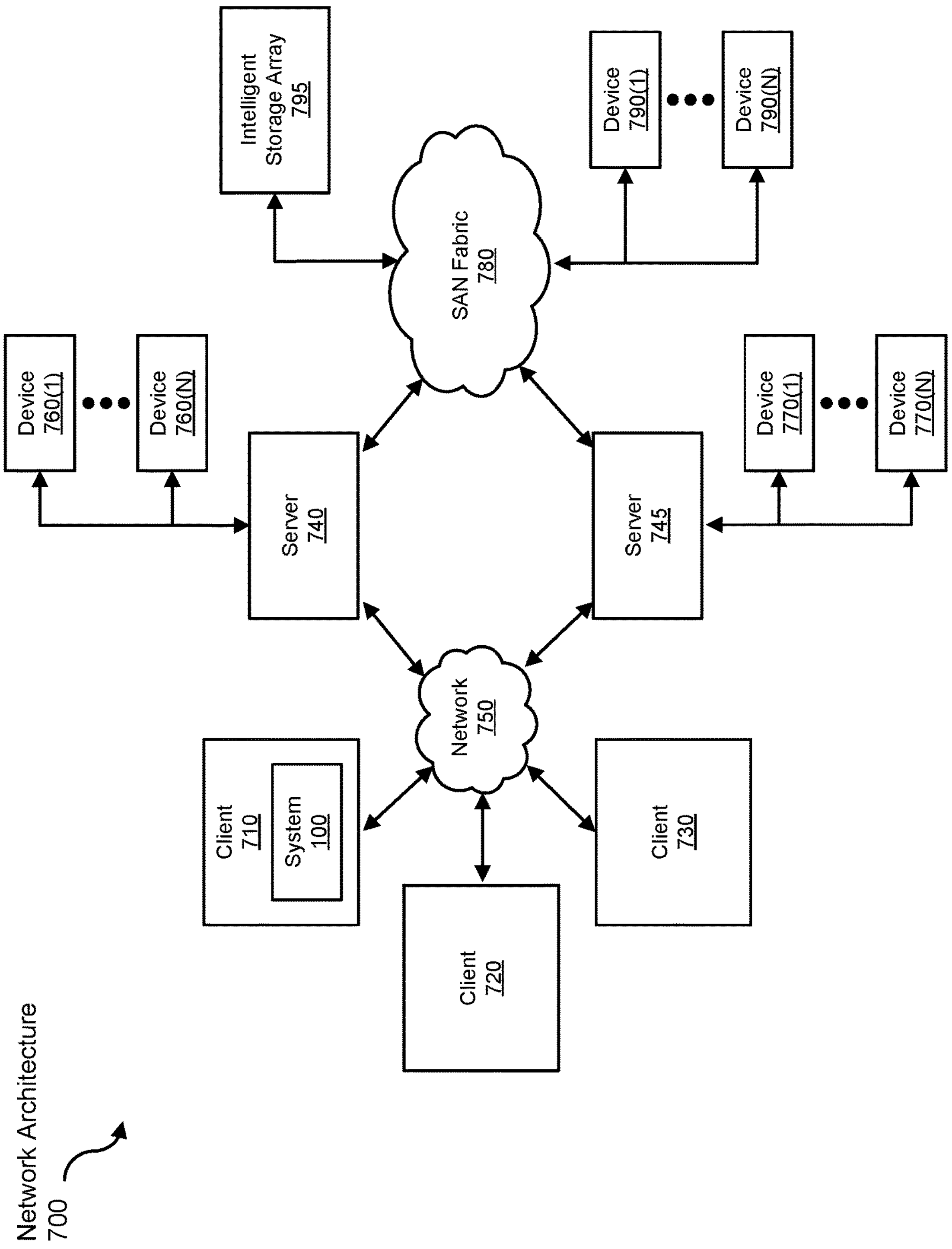
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers

740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing a security assistant for performing security tasks based on received mixed media inputs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising".

What is claimed is:

1. A computer-implemented method for utilizing a security assistant for performing security tasks based on received mixed media inputs, at least a portion of the method being performed by one or more computing devices comprising at least one processor, the method comprising:

identifying, by the one or more computing devices, a context associated with mixed media content;

identifying, by the one or more computing devices, a type of media of the mixed media content;

determining, by the one or more computing devices, a security task associated with the mixed media content based on the context and the type of media;

clarifying, by the one or more computing devices, an ambiguity from the context associated with the mixed media content;

identifying, by the one or more computing devices, the security task in response to clarifying the ambiguity; and performing, by the one or more computing devices, a security action that protects against potential security threats in the mixed media content corresponding to the security task by extracting identifiers from the mixed media content for detection.

2. The computer-implemented method of claim 1, wherein identifying the context associated with the mixed media content comprises:

receiving a screenshot of the mixed media content;

analyzing the screenshot to identify information associated with the mixed media content; and identifying the context based on the information.

3. The computer-implemented method of claim 2, wherein receiving the screenshot of the mixed media content comprises:

monitoring a device display by a security application executing on the one or more computing devices; and capturing the screenshot from the device display.

4. The computer-implemented method of claim 2, wherein the information associated with the mixed media content comprises:

metadata;

message data;

website data; or application data.

5. The computer-implemented method of claim 4, wherein the metadata comprises at least one of:

a timestamp;

an image location tag; or location data.

6. The computer-implemented method of claim 1, wherein determining the security task associated with the mixed media content comprises:

training a machine-learning algorithm to categorize image data describing the mixed media content into one or more classes; and determining the security task based on the one or more classes.

7. The computer-implemented method of claim 6, wherein the machine-learning algorithm comprises a deep learning network algorithm.

8. The computer-implemented method of claim 1, wherein determining the security task associated with the mixed media content comprises:

training a machine-learning algorithm to perform image-captioning on an image comprising the mixed media content; and retrieving a description of the image comprising the mixed media content based on the image-captioning.

9. The computer-implemented method of claim 1, wherein clarifying the ambiguity based on the context associated with the mixed media content comprises at least one of:

presenting a list of potential analysis tasks for selection by a user as the security task; or presenting a list of disambiguating questions to the user for identifying the security task.

10. The computer-implemented method of claim 1, wherein performing the security action that protects against the potential security threats in the mixed media content by extracting the identifiers from the mixed media content for detection comprises:

identifying one or more entities associated with the potential security threats from the mixed media content;

extracting the one or more entities as the identifiers; and submitting the extracted identifiers to a threat detection model.

11. A system for utilizing a security assistant for performing security tasks based on received mixed media inputs, the system comprising:

at least one physical processor;

physical memory comprising computer-executable instructions corresponding to one or more modules that, when executed by the physical processor, cause the physical processor to:

identify, by an identification module, a context associated with mixed media content;

identify, by the identification module, a type of media of the mixed media content;

determine, by a determining module, a security task associated with the mixed media content based on the context and the type of media;

clarify, by a disambiguating module, an ambiguity from the context associated with the mixed media content;

identify, by the determining module, the security task in response to clarifying the ambiguity; and perform, by a security module, a security action that protects against potential security threats in the mixed media content corresponding to the security task by extracting identifiers from the mixed media content for detection.

12. The system of claim 11, wherein the identification module identifies the context associated with the mixed media content by:

receiving a screenshot of the mixed media content;

analyzing the screenshot to identify information associated with the mixed media content; and identifying the context based on the information.

13. The system of claim 12, wherein the screenshot of the mixed media content is received by:

monitoring a device display by a security application; and capturing the screenshot from the device display.

14. The system of claim 12, wherein the information associated with the mixed media content comprises:

metadata;

message data;

website data; or application data.

15. The system of claim 14, wherein the metadata comprises at least one of:

a timestamp;

an image location tag; or location data.

16. The system of claim 11, wherein the determining module determines the security task associated with the mixed media content by:

training a machine-learning algorithm to categorize image data describing the mixed media content into one or more classes; and determining the security task based on the one or more classes.

17. The system of claim 16, wherein the machine-learning algorithm comprises a deep learning network algorithm.

18. The system of claim 11, wherein the determining module determines the security task associated with the mixed media content by:

training a machine-learning algorithm to perform image-captioning on an image comprising the mixed media content; and retrieving a description of the image comprising the mixed media content based on the image-captioning.

19. The system of claim 11, wherein the disambiguation module clarifies the ambiguity based on the context associated with the mixed media content by presenting at least one of:

a list of potential analysis tasks for selection by a user as the security task; or a list of disambiguating questions to the user for identifying the security task.

20. A non-transitory computer-readable medium comprising one or more computer-executable instructions that, when executed by at least one processor of a computing device, cause the computing device to:

identify a context associated with mixed media content;

identify a type of media of the mixed media content;

determine a security task associated with the mixed media content based on the context and the type of media;

clarify an ambiguity from the context associated with the mixed media content;

identify the security task in response to clarifying the ambiguity; and perform a security action that protects against potential security threats in the mixed media content corresponding to the security task by extracting identifiers from the mixed media content for detection.

* * * * *